Figure 1:
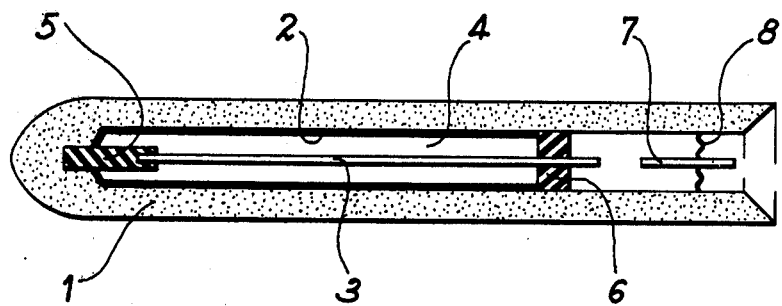

United States Patent [19]

Hulot et al.

[11] 4,284,892
[45] Aug. 18, 1981

[54] METHOD AND DEVICE FOR THE AUTOMATIC READING OF THE IRRADIATION DOSE OF A PORTABLE DOSIMETER

[75] Inventors: Michel Hulot, Montrouge; Raymond Prigent, Marcoussis, both of France

[73] Assignee: Commissariat a l'Energie Atomique, Paris, France

[21] Appl. No.: 55,119

[22] Filed: Jul. 5, 1979

[30] Foreign Application Priority Data

Jul. 12, 1978 [FR] France .................................. 78 20806

[51] Int. Cl.³ .............................................. H01J 39/29
[52] U.S. Cl. .................................... 250/388; 250/376
[58] Field of Search ............... 250/388, 378, 374, 375, 250/389, 376; 324/72, 60 CD, 109

[56] References Cited

U.S. PATENT DOCUMENTS

| | | | |
|---|---|---|---|
| 2,861,191 | 11/1958 | Chao et al. | 250/388 |
| 3,010,021 | 11/1961 | Roesch et al. | 250/375 |
| 3,984,690 | 10/1976 | Marshall et al. | 250/375 |
| 4,020,349 | 4/1977 | McCall | 250/388 |

Primary Examiner—Alfred E. Smith
Assistant Examiner—Carolyn E. Fields
Attorney, Agent, or Firm—Sughrue, Rothwell, Mion, Zinn and Macpeak

[57] ABSTRACT

A method for the automatic reading of the radiation dose of a portable dosimeter with an ionization chamber provided with a capacitor $C_1$, and a device for carrying out said method, said device comprising means for measuring the value of the ionization chamber charge at each reading operation and means for storing the value of the charge of said ionization chamber, as well as means for calculating the radiation dose D at any moment from one of the stored values and from the value of the charge of said chamber at said moment.

5 Claims, 2 Drawing Figures

METHOD AND DEVICE FOR THE AUTOMATIC READING OF THE IRRADIATION DOSE OF A PORTABLE DOSIMETER

The present invention relates to a method for the automatic reading of the radiation dose of a portable dosimeter provided with an ionisation chamber. It also relates to a device for carrying out said method. Said method and device can be applied, in particular, to measuring the radiation dose to which the staff is submitted in nuclear plants or laboratories.

In nuclear plants, a few repair or maintenance operations are made under radiation, with dose rates that may reach pretty high levels in some cases. It is therefore important, at the end or during every working period at a given operative station, to be informed of the actual dose received by the staff involved and also, for instance, the dose accumulated in three months or in the course of a full year, so as to make sure that the regulations in force in that particular field have been duly complied with; It is thus possible to obtain records covering several years. Accordingly, the staff have to carry dosimeters with them, in order to make it possible to know the radiation dose absorbed in the course of certain operations.

There exist portable dosimeters of various types, and in particular:

radiothermoluminescent or radiophotoluminescent dosimeters, easy to use but implying a rather intricate reading technique that requires the skill of laboratory people;

direct-reading portable dosimeters, more commonly called pencil dosimeters. A dosimeter of that type generally comprises a small size ionisation chamber, containing an electroscope. The chamber collection electric field is obtained by charging the capacity between the electroscope electrodes and the additional capacity defining the dosimeter measuring scale, by means of an outer charging device. Radiations cause said capacity to be discharged. The discharge is measured by the electroscope incorporated in the pencil dosimeter: the electroscope mobil portion is displaced according to electric charge attraction or repulsion in accordance with Coulomb's laws. The displacement of said mobil portion of the electroscope is detected by means of an optical system comprising a microscope associated with a graduated scale. Such a dosimeter is very sensitive to shocks, so that there is a risk of errors in the measurement of the doses received. Moreover, the measurement range and the number of graduations in the scale are limited, so that readings are rather difficult and usually entrusted to a qualified staff who, in addition, is in charge of resetting, viz re-charging, the pencil dosimeter. Such a resetting is not easily carried out. In practice, the measurement of the doses received is deducted from the calculation of the difference between the index position on the microscope after irradiation and the initial position of said index, such as inscribed on a register prior to using said dosimeter;

indirect-reading dosimeters, more commonly known as capacitive pencil dosimeters. A capacitive pencil dosimeter is generally constituted by a cylindrical tube forming one electrode and an axial wire forming a second electrode; the tube is filled with air at atmospheric pressure and a potential difference is applied between these electrodes. So long as no radiation has passed through the air in that chamber, the axial electrode voltage remains unchanged. The background noise of cosmic and electric radiations does not discharge the chamber until several weeks. Whenever a relatively intense radiation passes through the chamber, the axial electrode voltage decreases gradually and the measurement of the residual voltage makes it possible to know the total amount of dose received by the person carrying the pencil dosimeter. Such a capacitive pencil dosimeter, although devoid of the drawbacks of the above pencil dosimeter, requires the use of a reading-charging device that can be handled only by the qualified staff.

Capacitive pencil dosimeters, as well as ordinary pencil dosimeters, do not lend themselves very well to the automation of the exploitation of measurements.

It is possible to carry out an automatic reading of optical measurement ionisation chambers, such as pencil dosimeters. Automatic reading of the charge of a pencil dosimeter consists in detecting the pencil dosimeter electroscope deflection by optical means; such means are coupled with a recording device. The optical means usually comprise a television camera coupled with means for treating the video signal. However, these treatment means are intricate and costly; moreover, in view of the great number of electronic components, the reading device is less reliable.

One object of the present invention is to obviate the above drawbacks and, in particular, to provide a method and a device allowing the automatic reading of an indirect-reading dosimeter, e.g. of the capacitive pencil type, without requiring a specially qualified staff, in particular as regards the handling of the reading-charging device.

To that end, the present invention relates to a method for the automatic reading of the radiation dose of a portable dosimeter provided with an ionisation chamber, comprising measuring the ionisation chamber charge at each reading, said method further comprising the steps of storing, or memorizing, the ionisation chamber charge at each reading, then, at any moment, calculating the radiation dose D, from one of the previously stored values and from the value of the chamber charge at said moment.

According to a particular feature of said method, after a reading operation, the ionisation chamber is biased by a voltage that is equal to the voltage just measured during said reading operation. Thus, the information is not deleted by the reading operation, which permits to refer to the dosimeter at any moment, through an auxiliary reading device.

The present invention also relates to a device for the automatic reading of the radiation dose of a portable dosimeter provided with an ionisation chamber, comprising means for measuring the ionisation chamber charge at each reading, said device further comprising means for storing, or memorizing, the ionisation chamber charge at every reading, and means for calculating the radiation dose D at any moment from one of the stored values and from the value of the chamber charge at said moment.

Preferably, the device according to the invention further comprises means for biasing the ionisation chamber after each reading with a voltage, the value of which corresponds to the just measured charge.

According to a particular feature, said means for storing the value of the ionisation chamber charge at each reading are connected with the means for measuring the ionisation chamber charge via an analogue-digital converter.

According to a further feature, the means for measuring the value of the ionisation chamber charge comprise an integrator-preamplifier.

According to a still further feature of the invention, said basing means comprise an amplifier, the gain of which is the reciprocal of the integrator-amplifier gain.

Figure 2:
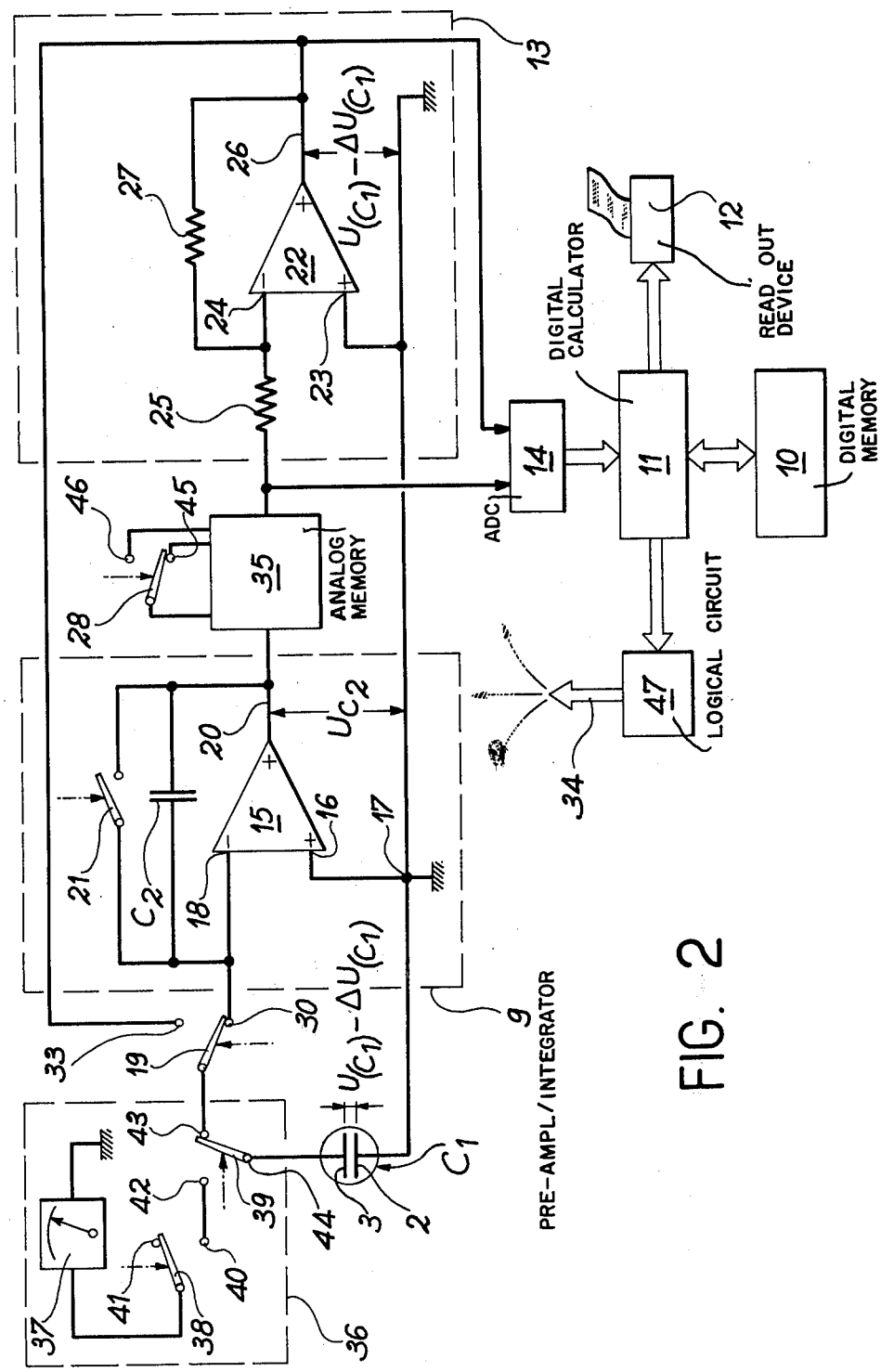

Other features will appear from the following description, given merely by way of example, with reference to the enclosed drawing, in which:

FIG. 1 shows a portable dosimeter provided with an ionisation chamber, of the capacitive pencil type, capable of being read by the method according to the invention and;

FIG. 2 repesents a device according to the invention, permitting the automatic reading of the radiation dose of the capacitive pencil dosimeter of FIG. 1.

The capacitive pencil dosimeter such as shown in FIG. 1 comprises a first electrode formed of a cylindrical tube 1, e.g. of "Bakelite" (trade-mark) covered with an inner graphite layer 2, and a second electrode constituted by an axial wire 3. Said axial electrode 3 is brought to a potential from 100 to 200 volts. The ionisation chamber is constituted by a space 4 filled with air; whenever a relatively intense radiation passes through said chamber, the axial electrode voltage gradually decreases, and, it is possible, through the measurement of the residual voltage, to know the pencil dosimeter residual electric charge and, therefore, the full radiation dose received by the person carrying the pencil dosimeter. In the figure are also shown insulating supports 5 and 6, adapted to retain axial electrode 3 inside cylinder 1. A contact member 7 carried, e.g., by a deformable insulating plate 8, provides an electrical connection between electrode 3 and an outer charging device while the pencil dosimeter is being charged, or during the reading of the potential value between the electrodes, when said pencil dosimeter has been submitted to radiations. Contact member 7 abuts the extremity of axial electrode 3 because of the deformation of plate 8. However any other means providing an electrical connection with said axial electrode might be contemplated. Means (not shown but to be described later on) are provided for automatically mounting the dosimeter in the reading device.

Quite obviously, cylinder 1 could be provided, on on its outer surface, with a magnetic or optical code, for instance, permitting to identify the pencil dosimeter.

In FIG. 2 is shown a device for automatically reading the radiation dose of a portable dosimeter of the capacitive pencil type provided with an ionisation chamber, such as shown in FIG. 1. Said device comprises means 9 for measuring the value of the ionisation chamber charge at each reading, through measurement of the biasing voltage of said chamber. The latter is diagramatically represented by capacitor $C_1$. Means 10 are provided for storing, or memorizing, the value of biasing voltage $UC_1$ of the ionisation chamber in digital form, at each reading, and, therefore, of the charge of said chamber; said means 10 comprise a non volatile digital memory, for instance, connected with means 11 for calculating the radiation dose D, at any moment, from one of the already stored values and from the value of the bias voltage that corresponds to the chamber charge at said moment. Said calculated dose D can, e.g., be printed or vizualised at a read-out device 12, such as a printer, a cathode-ray tube display device or a digital voltmeter.

The device according to the invention also comprises means 13 adapted to re-charge the ionisation chamber represented by capacitor $C_1$ with a bias voltage after each reading, the value of said bias voltage being equal to that of the just measured voltage, corresponding to the charge of the ionisation chamber at the moment of the reading operation. Digital memory 10 is connected with measurement means 9 and with means 13 for biasing the ionisation chamber, via calculator 11, an analogue-digital converter 14 and an analogue storing device, or memory, 35.

The means for measuring the value of the bias voltage of ionisation chamber $C_1$ are constituted by an integrator-preamplifier comprising an operational amplifier 15 with a very weak input current, the inlet 16 of which is connected with electrode 2 of the ionisation chamber, said electrode being at a reference potential 17, for instance. Another inlet 18 of said amplifier is connected with electrode 3 of the ionisation chamber, through a switch 19, the operation of which will be explained later on. Said other inlet 18 is also connected with outlet 20 of operational amplifier 15, through a capacitor $C_2$. The pre-amplifying mounting constituted by operational amplifier 15 and by capacitors $C_1$ and $C_2$ is a mounting of the integrating type. A switchh 21, the operation of which will be explained later on, is controlled by a logical circuit 47 adapted to close said switch. The closing of switch 21 induces the discharge of $C_2$, after a measuring operation. The gain of the just described pre-amplifier is 1/A that is equal to $C_1/(C_1+C_2)$, $C_1$ and $C_2$ being the capacity values corresponding to these references. Indeed, capacitor $C_2$, associated with capaciter $C_1$ of the ionisation chamber, constitutes a capacitive voltage divider. Such a peculiar feature of the device permits to adapt the ionisation chamber's relatively high voltage $UC_1$, to the input voltage restrictions peculiar to pre-amplifiers with a very weak input current, like operational amplifier 15. Means 13 permitting to re-charge the ionisation chamber to a value corresponding to the bias voltage of said chamber with a voltage equal to the just measured voltage, comprise an amplifier mounting constituted by operational amplifier 22. One inlet 23 of said amplifier is connected to reference potential 17, while another inlet 24 is connected to the outlet 26 of said operational amplifier, through the resistor 27. Inlet 24 is also connected to the outlet 20 of amplifier 15, through a resistor 25 and analogue memory 35, provided with a control switch 28, the operation of which will be explained later on. The resistance of resistors 25 and 27 is $R_1$ and $R_2$, respectively. The gain of the amplifying mounting constituted by operational amplifier 22 and resistors 25 and 27 is $A=R_2/R_1$. That gain is so selected as to be equal to the reciprocal of the gain of the pre-amplifying mounting constituted by operational amplifier 15 and capacitors $C_2$ and $C_1$. It follows that, if the gain of amplifier 15 is given by formula $9(15)=C_1/(C_1+C_2)=1/A$, the gain of amplifier 22 will be given by formula $9(22)=A=R_2/R_1=(C_1+C_2)/C_1$.

The device according to the invention also comprises means 36 for simulating the radiation dose; the latter means are constituted by a feed electric source 37, the outlet voltage of which can be so regulated as to charge the dosimeter by applying various bias voltages. It is thus possible to calibrate said dosimeter by radiation dose simulation, in the form of a bias voltage. Said means 36 also comprise two switches 38 and 39. When switch 38 is in position 41 and switch 39 in position 43, the dosimeter is disconnected from electric source 37; if on the other hand, switch 38 is in position 40 and switch 39 is in position 42, said dosimeter is charged by said electric source 37. It is then sufficient to cause switch 39 to tilt to position 43 and switch 19 to tilt to position 30 for measuring the simulated dose.

Means 36 can also be used as an automatic device for charging the ionisation chamber of a dosimeter with an incorporated electroscope prior to using the latter. In this way, the reading of the dosimeter during use comprises rendering the charge necessary for re-setting the dosimeter dependent on the electroscope sensitiveness, in order that the reading of the dosimeter radiation dose may be carried out independently of the electroscope, by means of the automatic device according to the invention. The method for automatically reading the portable dosimeter radiation dose will be more clearly understood from the description of the device operation.

Whenever a reading of the radiation dose has to be carried out, the dosimeter is automatically fed into the reading device. Switch 19 is in position 30, whereas switch 39 is in position 43. When the dosimeter is being fed into the device, contact member 7 causes electrode 3 to be connected to terminal 44 of switch 39, in view of plate 8 being deformed (FIG. 1). The ionisation chamber charge is transferred to operational amplifier 15. Whereas said ionisation chamber, prior to the dosimeter irradiation, was charged due to the application of the bias voltage $UC_1$, said chamber, following irradiation, is caused to be partially discharged by an amount corresponding to voltage drop $\Delta UC_1$. Accordingly, the potential difference between electrodes 2 and 3 of the ionisation chamber, represented by $C_1$, is equal to $UC_1 - \Delta UC_1$. Voltage $UC_2$ as measured at the outlet of operational amplifier 15 is proportional to voltage $UC_1 - \Delta(UC_1)$ at the inlet of said amplifier, so that we have:

$$U(C_2) = U(C_1) - \Delta U(C_1) \frac{C_1}{C_1 + C_2}.$$

Voltage drop $\Delta UC_1$ at the terminals of the ionisation chamber represents the charge decrease of said chamber when the latter has been submitted to a radiation corresponding to dose D. We have $\Delta UC_1 = S.D.$, S being the ionisation chamber sensitivity, expressed in volts/rad.

Therefore, $$UC_2 = UC_1 - S.D \cdot \frac{C_1}{C_1 + C_2}.$$

The analogue value of voltage $UC_2$ is stored in analogue memory 35. The latter, to a large extent, permits to reduce the charge drift of $C_2$ resulting from the fact that integrator-pre-amplifier 9 is not perfect and that, in a commercial automatic apparatus, it is out of the question to make fine adjustments of the circuit as in a laboratory device.

Besides, it is possible to programme the calculator so as to carry out automatic settings during the automatic control by means 36 for simulating the radiation dose. Said analogue memory and the automatic setting means possibly used thus contribute to improving the apparatus accuracy. Said memory 35 keeps the voltage analogue value $UC_2$ so long as switch 28 is in position 45, whereas said analogue value is transferred to bias means 13 and to analogue-digital converter 14, when switch 45 is in position 46, for instance. The analogue value of voltage $UC_2$, when transfer is carried out, is transformed into a digital value by converter 14. The said digital value is fed into calculator 11. In memory 10 of said calculator, the digital value of bias voltage $UC_1$ the ionisation chamber has been previously recorded before submitting the capacitive pencil dosimeter to radiations. In said memory 10 can also be recorded the sensitiveness S of the chamber identification code. The latter has already been described hereinbefore.

Starting from given values $UC_2$, $UC_1$, S, $C_1$, $C_2$, the calculator provides D, given the following formulas:

$$D = \frac{UC_1 \frac{C_1}{C_2 + C_1} - UC_2}{S \cdot \frac{C_1}{C_2 + C_1}}$$

Each of the parameters of the measuring operation, viz. the ionisation chamber initial bias voltage, the charge transfer, the pre-amplifier gain and drift during the measuring operation, can be obtained with a reliable accuracy from 1 to a few thousandths. The error due to the reading device is of the same order. In fact, the overall accuracy of the measurement depends on the determination of the ionisation chamber sensitiveness and on the electric leaks of said chamber. When a measurement of radiation dose D is being carried out, switch 28 is in position 46 so as to allow the transfer of voltage $UC_2$ value to calculator 11 and to bias means 13; therefore, voltage $UC_2$ is also applied at inlet 24 of operational amplifier 22; the latter, the gain of which is equal to $R_2/R_1 = A = (C_1+C_2)/C_1$ i.e. the reciprocal of gain 1/A of the amplifying mounting of measuring means 9, permits to apply a bias voltage equal to $UC_1 - \Delta UC_1$ to the ionisation chamber terminals. At the moment of transferring analogue value $UC_2$, switch 19 is, of course, assumed to be in position 33. Therefore, the ionisation chamber capacitor $C_1$ that had been discharged into capacitor $C_2$ following the measuring operation, is re-charged by a voltage equal to the chamber bias voltage, prior to the measuring operation. The capacitive pencil dosimeter can then be disconnected from the measuring device in order to be submitted to further radiation doses. After each measuring operation, switch 21 is closed, so as to allow capacitor $C_2$ to be discharged, with a view to carrying out a further measuring operation. The opening or closing of controllable switches 19, 21, 28, 38, 39, can be automatically achieved by means of logical circuit 47 constituted, in a manner known per se, by gates and field-effect transistors (F.E.T.), for instance, controlled by calculator 11. These switches can comprise mobile parts, or can be constituted by electro-mechanical relays, for instance, or else can be fully static (for instance, semi-conductor devices). The control signal are delivered by the outlets 34 of said logical circuit. For the sake of clarity, the latter outlets have not been connected to switches 19, 21, 28, 38 and 39. Outlet 26 of operational amplifier 22 can, in its turn, be connected to analogue-digital converter 14 in order that calculator 11 can record, in its memory 10, the value of the ionisation chamber bias voltage, prior to the measuring operation. Thus, ionisation chamber $C_1$, that can be re-charged by a voltage equal to the bias voltage of said chamber prior to the measuring operation, can, in the long run, totalize the overall radiation dose to which the capacitive pencil dosimeter has been submitted. In the same way, since all the bias voltage values at the moment of the reading operation are kept in memory 10, it is thus possible to know the radiation dose to which a person has been submitted for a given period of time.

The means for biasing the ionisation chamber after the reading operation might be constituted by a voltage converter monitored by the chamber bias voltage at the moment of a measuring operation.

By way of example, the sensitiveness of the automatic reading device can be determined as follows, for an ionisation chamber with a capacity $C_1$ equal to 2.7 picofarads:

if the chamber initial charge voltage is:

$$U_O(C_1) = 130 \text{ volts};$$

if the integrating capacitor of the reading device has a capacity of: $C_2 = 80.4$ pF.

It follows that the voltage as measured by the device, for a non irradiated chamber, is equal to:

$$U_O(C_2) = U_O(C_1) \cdot \frac{C_1}{C_2} = 4.365 \text{ volts}.$$

In the case of a dose of 0.1 rad, the voltage lost through the discharge of the chamber is equal to:

$$\Delta U(C_1) = 96 \text{ volts}.$$

After such an irradiation up to 0.1 rad, the ionisation chamber residual voltage is equal to:

$$U(C_1) = 34 \text{ volts}.$$

It follows that the ionisation chamber sensitiveness is equal to $$S = \frac{\Delta U(C_1)}{D} \text{ 960 volts} \cdot \text{rad}^{-1}.$$

In the same way, it can be deducted that the variation of the voltage as measured by the device after such an irradiation, is equl to:

$$\Delta U(C_2) = U(C_1) \frac{C_1}{C_2} = 3.224 \text{ volts}.$$

The device sensitiveness therefore corresponds to $$S = \frac{\Delta U(C_2)}{D} = 32.24 \text{ volts} \cdot \text{rad}^{-1},$$

viz. 32 millivolts for 1 millirad.

In case the capacitive pencil dosimeters read by means of the automatic reading device according to the invention have various calibrations, the device for deciphering the identification code of the pencil-dosimeter (not shown in FIG. 2) is in a position to deliver a signal permitting to order an automatic switching of capacitor $C_2$ to another capacitor having an appropriate value for each respective pencil-dosimeter.

The ionisation chamber is perfectly sealed and its charge collection anode (viz. the axial electrode) is not electrically connected with the outside in a permanent manner. Such an arrangement permits to reduce the capacitive pencil-dosimeter leaks, which is an advantage, since such leaks would lead to the indication of a parasitic dose in the absence of irradiation.

In addition to their major interest as regards the radio-protection of the staff of nuclear plants or laboratories, the method and device according to the invention can be applied to various fields such as e.g.:

all the possible applications of ionizing radiations and, in particular, sealed or non-sealed sources, labelled molecules, grammagraphy, diagnostic or therapeutic radiations, archeology, etc.;

the control of the sterilization of surgical instruments, surgical bandages, medicaments, food products, perishable products, sterile wrappings, etc, through irradiation;

the control of the treatment through irradiation against micro-organisms, parasites, moulds, etc;

the control of chemical treatments under radiations;

metrology of electrical charges and currents (in particular if weak) whatever be their origine;

measuring and a treatment system associated to pick-up devices delivering charge current and, more generally, the measurement of weak currents of from $10^{-6}$ to $10^{-15}$ ampere;

the measurement or detection of aerosols, dust, smoke, fire, etc;

electrosatic measurements, measurements of electrical fields and their variations, measurements of electrets for the detection of ionizing radiations, pressure measurements from pressure pick-up devices.

Quite obviously, various changes can be made in the method and device as disclosed herein above without going beyond the scope of the present invention.

What is claimed is:

1. A device for automatically reading the radiation dose of a portable dosimeter with an ionisation chamber, comprising: means for measuring the value of the ionisation chamber charge at each reading operation; means for storing the value of the charge of said ionisation chamber at each reading operation; means for calculating the radiation dose, at any moment, from one of the stored values and from the chamber charge value at said moment; and means for biasing the ionisation chamber, after a reading operation, with a voltage equal to the voltage corresponding to the just measured charge; wherein said means for storing the value of the charge of said ionisation chamber at each reading operation are connected to said means for measuring the ionisation chamber charge, via an analogue-digital converter; and wherein said means for measuring the ionisation chamber charge comprise a pre-amplifier-integrator for said ionisation chamber, designed according to the capacitive divisor constituted by a capacitor of said chamber and by an integrating capacitor of said pre-amplifier-integrator.

2. A device according to claim 1, wherein said biasing means comprise an amplifier, the gain of which is the reciprocal of the gain of said pre-amplifier-integrator, said amplifier being connected at the outlet of said pre-amplifier.

3. A device according to claim 2, further comprising automatic means for placing said dosimeter in said measuring means.

4. A device according to claim 2, wherein said amplifier is connected to said pre-amplifier through an analogue memory, with a view to reducing the measurement drift.

5. A device according to any one of claims 1, 2, 3, or 4 further comprising means for simulating radiation doses.

* * * * *